United States Patent
Steil et al.

(10) Patent No.: US 6,802,704 B2
(45) Date of Patent: Oct. 12, 2004

(54) LATCHING DEVICE FOR INJECTION MOLDS WITH REMOVABLE INSERTS

(75) Inventors: Frederick G. Steil, Lake Orion, MI (US); James O. Adas, Clinton, MI (US); Frank J. Eigler, Windsor (CA)

(73) Assignee: D-M-E Company, Madison Heights, MI (US)

( * ) Notice: Subject to any disclaimer, the term of this patent is extended or adjusted under 35 U.S.C. 154(b) by 150 days.

(21) Appl. No.: 10/297,894
(22) PCT Filed: Jun. 15, 2001
(86) PCT No.: PCT/US01/19123
§ 371 (c)(1), (2), (4) Date: Dec. 10, 2002
(87) PCT Pub. No.: WO01/98049
PCT Pub. Date: Dec. 27, 2001

(65) Prior Publication Data
US 2003/0209832 A1 Nov. 13, 2003

Related U.S. Application Data
(60) Provisional application No. 60/212,150, filed on Jun. 16, 2000.

(51) Int. Cl.[7] ................................................ B29C 33/30
(52) U.S. Cl. .................. 425/192 R; 29/426.1
(58) Field of Search ........................... 425/190, 192 R, 425/589; 29/401.1, 426, 426.2, 428

(56) References Cited

U.S. PATENT DOCUMENTS

| | | | | | |
|---|---|---|---|---|---|
| 4,655,275 | A | * | 4/1987 | Worner | 425/190 |
| 5,114,330 | A | * | 5/1992 | Nielsen | 425/193 |
| 5,350,289 | A | * | 9/1994 | Martin | 425/190 |

* cited by examiner

*Primary Examiner*—James P. Mackey
(74) *Attorney, Agent, or Firm*—John W. Gregg; Stephen H. Friskney

(57) ABSTRACT

A latching device (20) for a mold assembly (10) uses a cam action to hold the "A" side plate against the hot runner system/nozzle plate (18) during operation. Preferably, a latch (20) is provided on each side of the mold to effectively hold the "A" side plate against the nozzle plate (18) during the high pressure injection of plastic melt. For purposes of a mold insert change, each latch (20) is rotated to release the "A" side plate from the nozzle plate (18), and hold the "A" side plate against the "B" side plate. This enables the "A" (12) and "B" (14) portions of the mold assembly to be moved away from the nozzle plate (18), thereby avoiding interference of the hot runner nozzles and "A" side insert and enabling quick mold insert change.

2 Claims, 9 Drawing Sheets

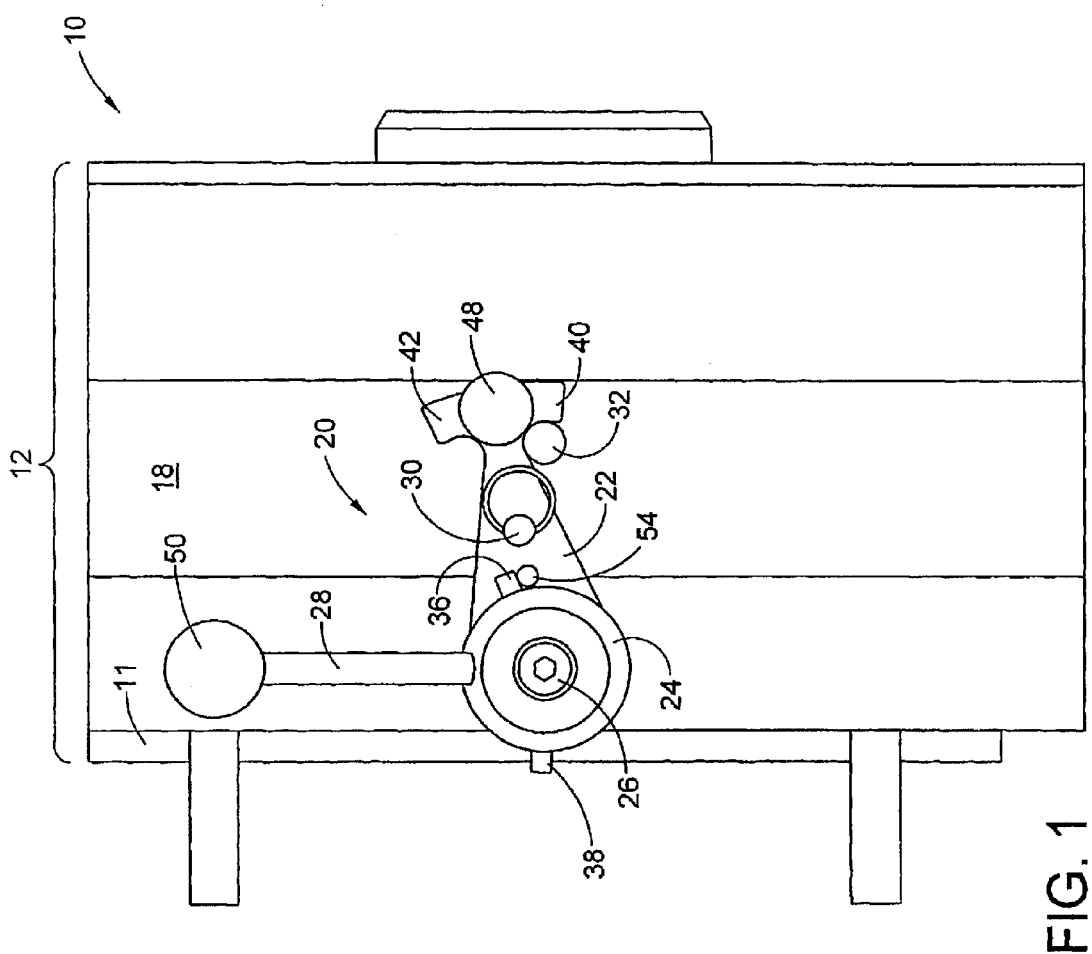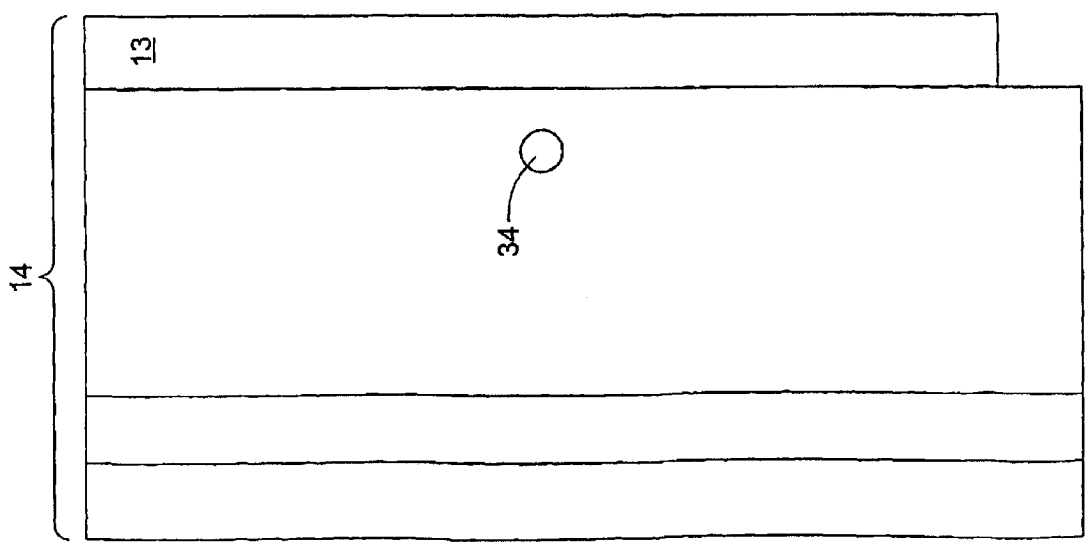
FIG. 1

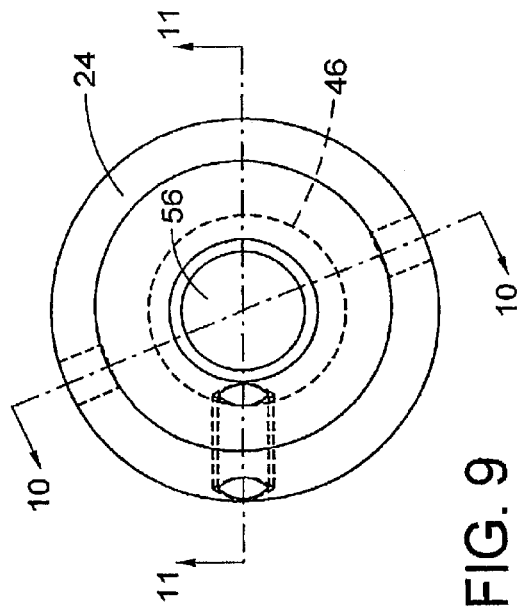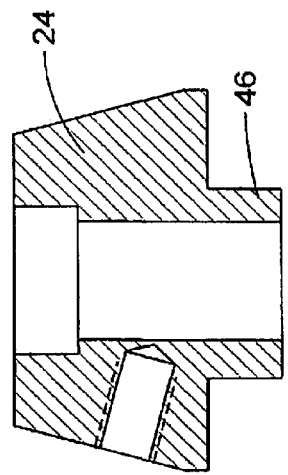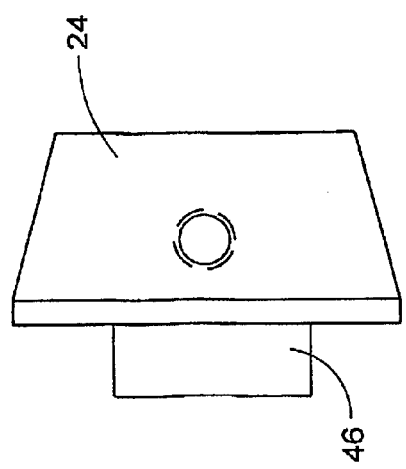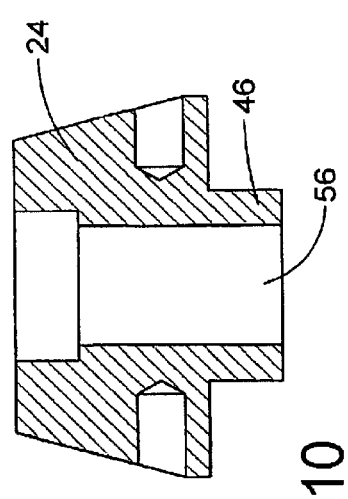

US 6,802,704 B2

LATCHING DEVICE FOR INJECTION MOLDS WITH REMOVABLE INSERTS

This application claims the benefit of provisional application Ser. No. 60/212,150 filed Jun. 16, 2000.

TECHNICAL FIELD

The present invention relates to molds used in injection molding machines. More particularly, the present invention relates to a latching device for use with an injection mold that includes removable inserts, to facilitate removal or changing of the mold inserts.

BACKGROUND ART

An injection molding machine operates so rapidly that it can quickly finish a run of a particular molded part in a comparatively short period of time. In view of the substantial cost of the machine, it should not be allowed to sit idle. When changing the set-up of the molding machine from production of one part to another, the article-forming mold in the machine has to be removed and a new mold inserted so that the machine can begin to operate and produce the new molded part. The time taken in changing the mold must be minimized so the machine can begin productive use as soon as possible. It currently takes from one to several hours to complete a complete mold change. The time lost in the mold change process has a marked effect on the profitability of a molding business.

Master Unit Die Products, Inc. ("MUD") significantly reduced the time required for mold changes with its invention of a "Quick Change System for Mold Bases" as described in U.S. Pat. No. 5,350,289. The MUD quick change system is used with molds having adapter frames that are attached to the platens of the injection molding machine. The adapter frames are readily transferable from machine to machine using the existing mounting hole patterns on the platens of the machines. The molds are typically supported on ear plates that are adapted to support many different size molds. The ear plates are also readily transferable from adapter frame to adapter frame. The adapter frames have a U-shaped guide and support channel for receiving the ear plates on the mold base. T-shaped guide rollers are mounted in line with the entrance to each side of the guide channel. The T-shape configuration for the guide rollers enables the edge of the ear plate to roll along the vertical portion of the "T" while the larger horizontal portion of the "T" captures the ear plate, keeping the ear plate in line with the guide channel on the adapter frame. The adapter frames are attached to the platen faces using the existing standard threaded hole pattern on the platen face. Clamps can be used for the initial installation of the adapter frame. The clamps are preferably removed after bolts or cap screws, or the like, are used to fasten the adapter plates to the face of the platen. When the ear plate is inserted into the adapter frame, all of the fasteners are covered, eliminating a potential source of damage during the operation of the machine. The MUD quick change system allows mold assemblies that are equipped with standard ear plates to be changed in a molding machine in ten minutes, or even less time.

However, when the MUD frame is used with a hot runner manifold system, the "A" side frame that accepts the "A" side insert is bolted to the hot runner system nozzle plate. If the MUD inserts need to be changed to a different set, the "A" side mounting screws have to be removed, and the "A" side has to be pulled away from the hot runner system, so that the nozzles are pulled out of the seal-off and gate well in the mold frame. This is necessary to obtain sufficient clearance so that the nozzles of the hot runner system do not interfere with removal of the inserts and installation of the replacement mold inserts. The removal of the "A" side mounting screws is time consuming and slows the process of changing the mold inserts significantly, somewhat negating the advantage of the MUD quick change concept.

DISCLOSURE OF INVENTION

Briefly stated, in accordance with one aspect of the present invention, a latching device is provided that uses a cam action to hold the "A" side plate against the hot runner system (nozzle plate) during operation, thus replacing the screws used in prior art mold constructions. Preferably, the latching device is provided on each side of the mold to hold most effectively the "A" side plate against the nozzle plate during the high pressure injection of plastic melt.

For purposes of a mold insert change, each latch is rotated to release the "A" side plate from the nozzle plate, and hold the "A" side plate against the "B" side of the mold. This enables the "A" and "B" portions of the mold assembly to be moved away from the nozzle plate, thereby avoiding interference between the hot runner nozzles and "A" side insert and enabling quick mold insert change.

The latching device of the present invention includes dowel pins in both the nozzle plate and "B" side plate. A pivoting latch arm is configured to engage one or the other of the pins, depending on the function to be performed. The latch arm pivots on a center hub with and offset to provide a cam-tightening effect when the hub is rotated by a latch lever. The latch is engaged with the dowel in the nozzle plate during operation. To perform a mold insert change: (i) the clamp mechanism of the molding machine is operated to close the mold, (ii) the center hub of the latching device is rotated using a lever to release the latching force between the "A" side and nozzle plate, (iii) the latch arm is rotated to engage the pin on the "B" side, (iv) the center hub is rotated by the latch lever to generate a latching force between the "A" and "B" sides, (v) a safety pin is inserted in the latch arm, (vi) the clamp mechanism of the molding machine is operated to open the mold, moving the "B" and "A" sides together to clear the hot runner nozzles, (vii) the mold inserts are removed, (viii) new mold inserts are installed, and (ix) sequence is reversed so that latch arm ends tightly engaged with the pin in the nozzle plate.

Accordingly, the latching device of the present invention provides for a time-saving means of releasing and connecting a mold assembly and a hot runner manifold system.

BRIEF DESCRIPTION OF DRAWINGS

FIG. 1 is a side view of an injection mold assembly shown open with the latching device of the present invention engaged to hold the "A" side plate to the nozzle plate of a hot runner system.

FIG. 8 is a side view of the center hub of the latching device of the present invention.

FIG. 9 is a top plan view of the center hub of the latching device of the present invention.

FIG. 10 is a sectional view of the center hub of the latching device of the present invention, taken along the line 10—10 of FIG. 9.

FIG. 11 is a sectional view of the center hub of the latching device of the present invention, taken along the line 11—11 of FIG. 9.

BEST MODE FOR CARRYING OUT THE INVENTION

Figure 2:
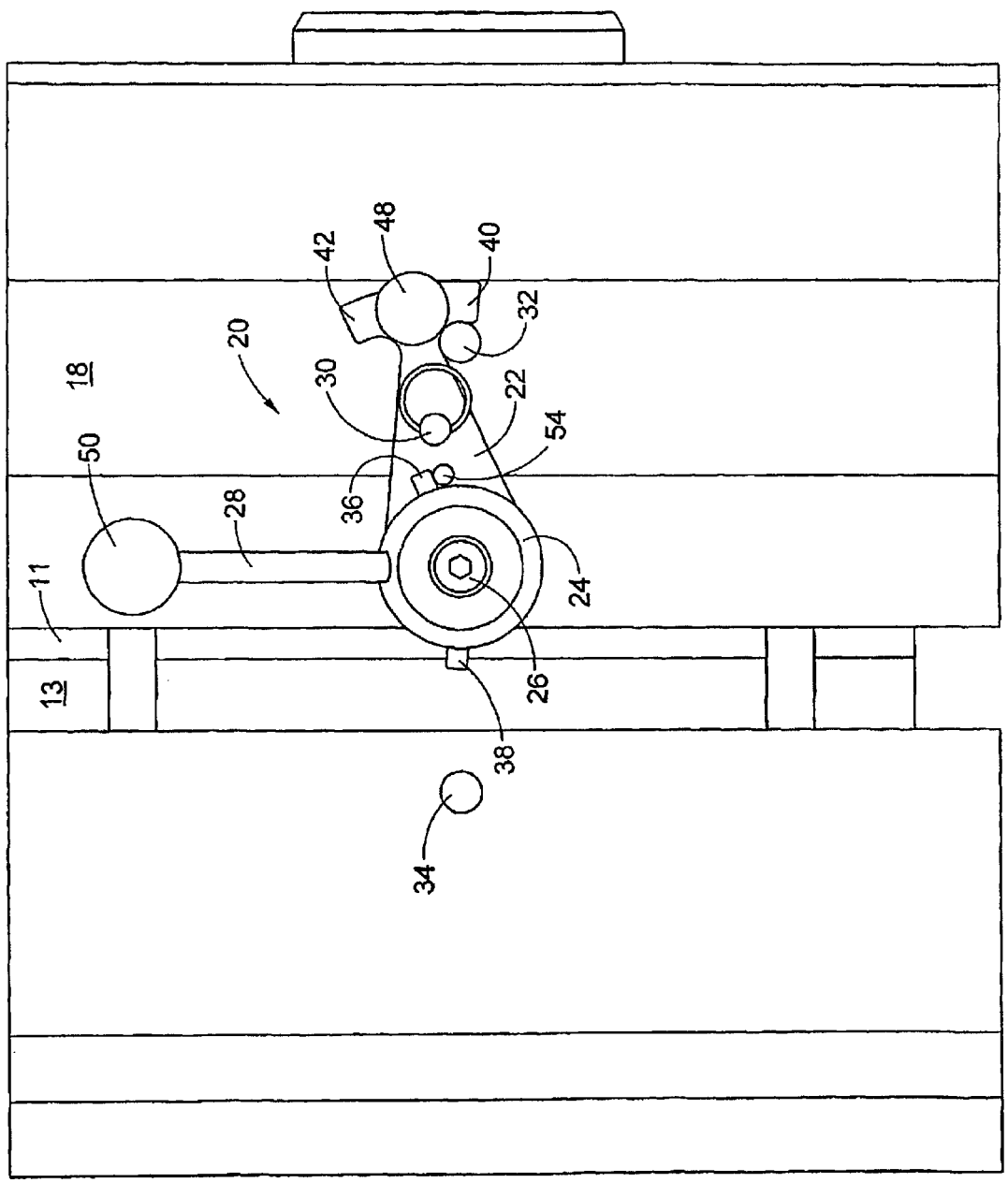
FIG. 2 is a side view of an injection mold assembly similar to FIG. 1, except that it is shown in a closed position.

Referring now to the drawings, particularly FIGS. 1 and 2, a mold assembly 10 is shown that incorporates a latching device 20 according to the present invention. For purposes of illustration, the invention will be described in connection with the MUD quick change mold system as used with mold bases having adapter frames that are attached to the platens of an injection molding machine. The MUD quick change system is supplied by Master Unit Die Products, Inc. ("MUD") and is described in detail in U.S. Pat. No. 5,350,289, which is incorporated herein by reference. However, it should be understood that the latching device of the present invention can be used in a variety of mold constructions for the purposes described herein, i.e., releasably holding mold elements together while various operations are performed.

Typically, as shown in the drawings, a mold assembly 10 has a cavity mold portion 11 and a core mold portion 13 that are included as part of a mold insert assembly 15. For purposes of simplifying this description, the cavity mold portion 11 will be referred to as part of the "A" side 12 of the mold 10, and the core mold portion 13 as part of the "B" side 14. As is understood in the art, each of the "sides" of the mold are formed in a multiple plate construction that varies-depending on the design of the molded part and the functions to be performed by the mechanisms contained in the mold assembly 10. Plastic melt is conveyed to the "A" side 12 by a hot runner system (not shown) including a nozzle retainer plate 18, as is generally known in the industry. D-M-E Company, the assignee of the present invention supplies a variety of mold constructions consistent with the purposes of this invention.

Figure 12:
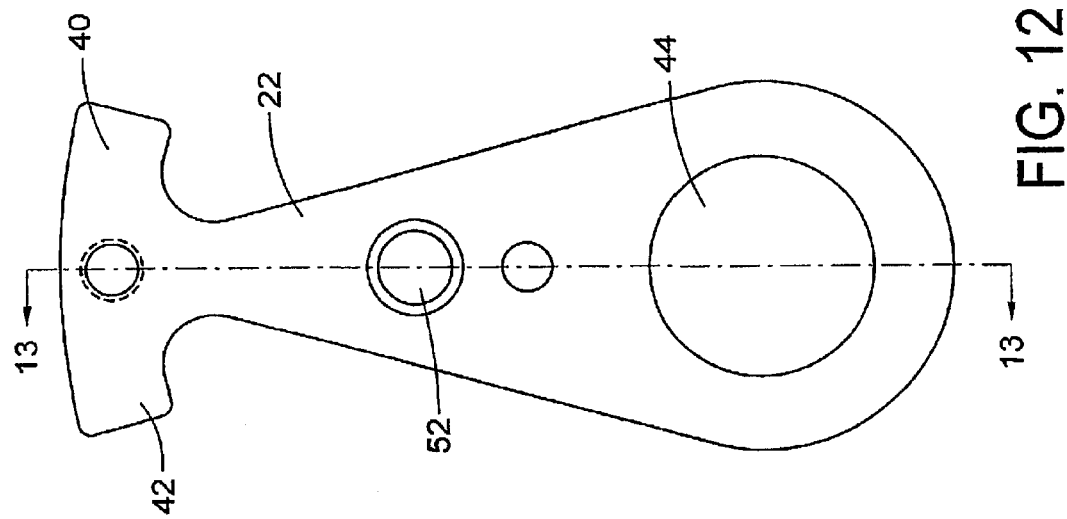
FIG. 12 is a top plan view of the latch arm of the latching device of the present invention.
Figure 13:
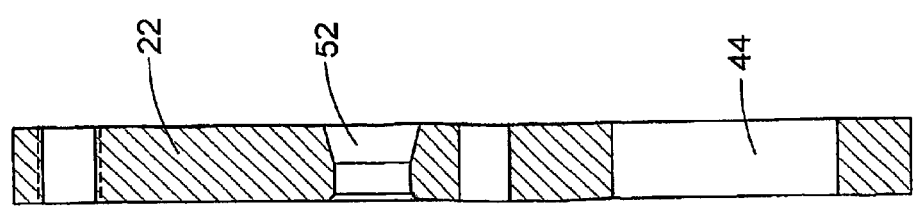
FIG. 13 is a sectional view of the latch arm of the latching device of the present invention, taken along the line 13—13 of FIG. 12.

The latching device 20 includes a latch arm 22 having opposed hooks 40,42 at one end and a pivot hole 44 at the other end; see FIGS. 12 and 13. The latch arm 22 mounts on a center hub 24 that is rotatably attached to the "A" side 12 by means of a shoulder bolt 26. The center hub 24 is configured so that the centerline of the hole 56 used to mount the hub 24 to the mold is offset slightly with respect to the axis of a cylindrical bearing surface 46 that is received in the hole 44 of the latch arm 22. This offset facilitates a camming action in the latching device 20, as will be more fully described below. With the construction shown in the drawings, one latching device 20 would be provided on each side of the mold assembly 10. Since the latches would essentially be the "mirror image" of each other, only one will be described in detail.

For facilitate operation the latching device 20, a latch lever 28 is attached to the center hub 24, which provides mechanical advantage in rotating the hub 24. For further ease of operation, handles 48, 50 can be provided on the latch arm 22 and latch lever 28, respectively. The center hub 24 is also provided with stop pins 36, 38 to limit the degree of rotation. In particular, the stop pins 36, 38 cooperate with a pin 54 in latch arm 22 for this purpose.

To retain the latch lever 22 in the desired position, a safety pin 30 is provided. The safety pin 30 is simply a cylindrical pin that is inserted through a hole 52 in the latch arm 22 and into an aligning hole in either the nozzle retainer plate 18 or "B" side 14 of the mold 10, depending on the position of the latch arm 22. The latching device 20 of the present invention includes a dowel pin 32 in both the nozzle retainer plate and a dowel pin 34 in the "B" side 14 of the mold for this purpose.

The latching device 20 is engaged with the dowel 32 in the nozzle plate 18 during operation. For a mold insert change: (i) the mold assembly 10 is closed, (ii) the center hub 24 is rotated by the latch lever 28 to release the latching force between the "A" side 12 and nozzle plate 18, (iii) the latch arm 22 is rotated to engage the 34 pin on the "B" side 14, (iv) the center hub 24 is rotated by the latch lever 28 to generate a latching force between the "A" side 12 and "B" side 14, (v) the safety pin 30 is inserted in the latch arm 22, (vi) the mold assembly 10 is opened so that the "A" side 12 (now attached to the "B" side 14) clear the hot runner nozzles, (vii) the mold inserts are removed, (viii) new mold inserts are installed, and (ix) sequence is reversed so that latch arm 22 ends tightly engaged with the pin 32 in the nozzle plate 18.

Figure 3:
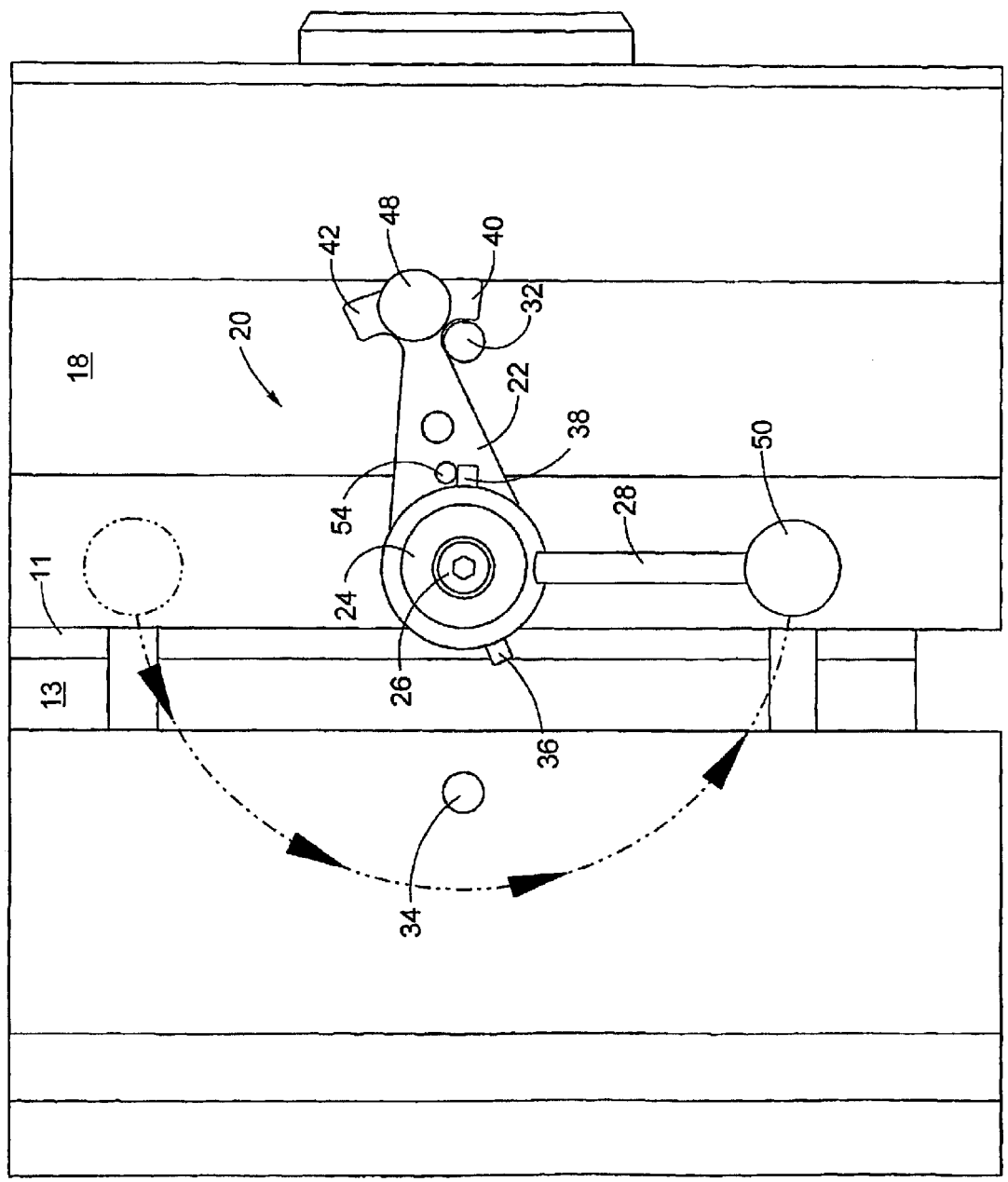
FIG. 3 is a side view of an injection mold assembly similar to FIG. 2, showing movement of the latch lever to rotate the center hub of the latching device of the present invention, thereby releasing the cam force.

The operation of the latching device is shown sequentially in FIG. 1 through FIG. 7. FIG. 1 shows the mold assembly 10 as it would be in normal operation: the latch arm 22 engaged with the dowel pin 32 in the nozzle retaining plate 18 plate; the center hub 24 positioned so that the stop pin 36 is against the pin 54, applying a camming force by means of the offset bearing surface 46; the safety pin 30 keeps the latch arm 22 in the engaged position; the hot runner nozzles (not shown) are seated in the "A" side 12 of the mold 10. In preparation for changing the mold inserts, the mold 10 is closed, as shown in FIG. 2. With the mold 10 closed, the safety pin 30 is removed, the center hub 24 is rotated by means of the latch lever 28 until the stop pin 38 contacts the pin 54, to release the latching force provided by the cam in the center hub 24, as shown in FIG. 3.

Figure 4:
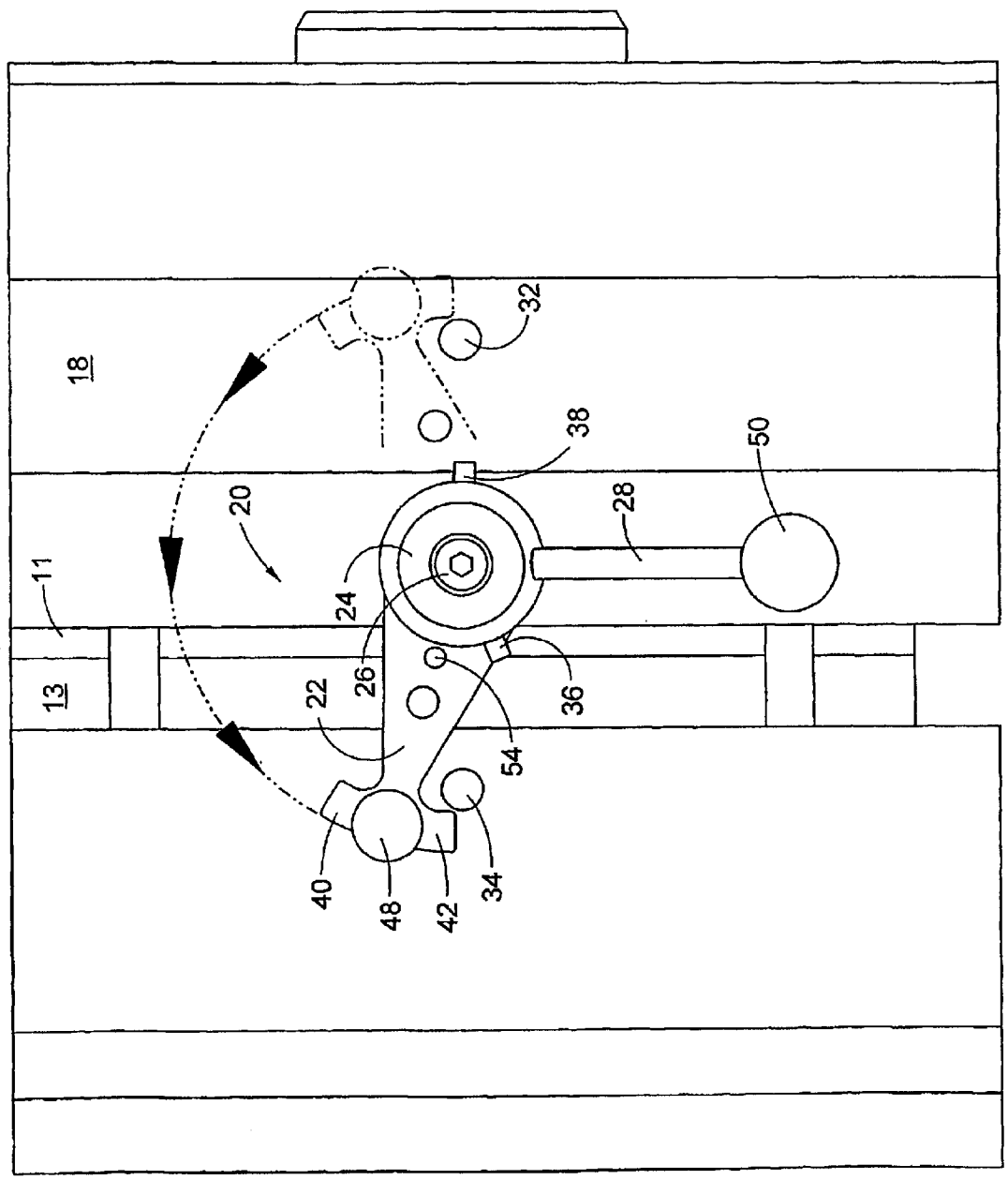
FIG. 4 is a side view of an injection mold assembly similar to FIG. 3, showing how the latch arm is rotated to engage the dowel pin in the "B" side plate.
Figure 5:
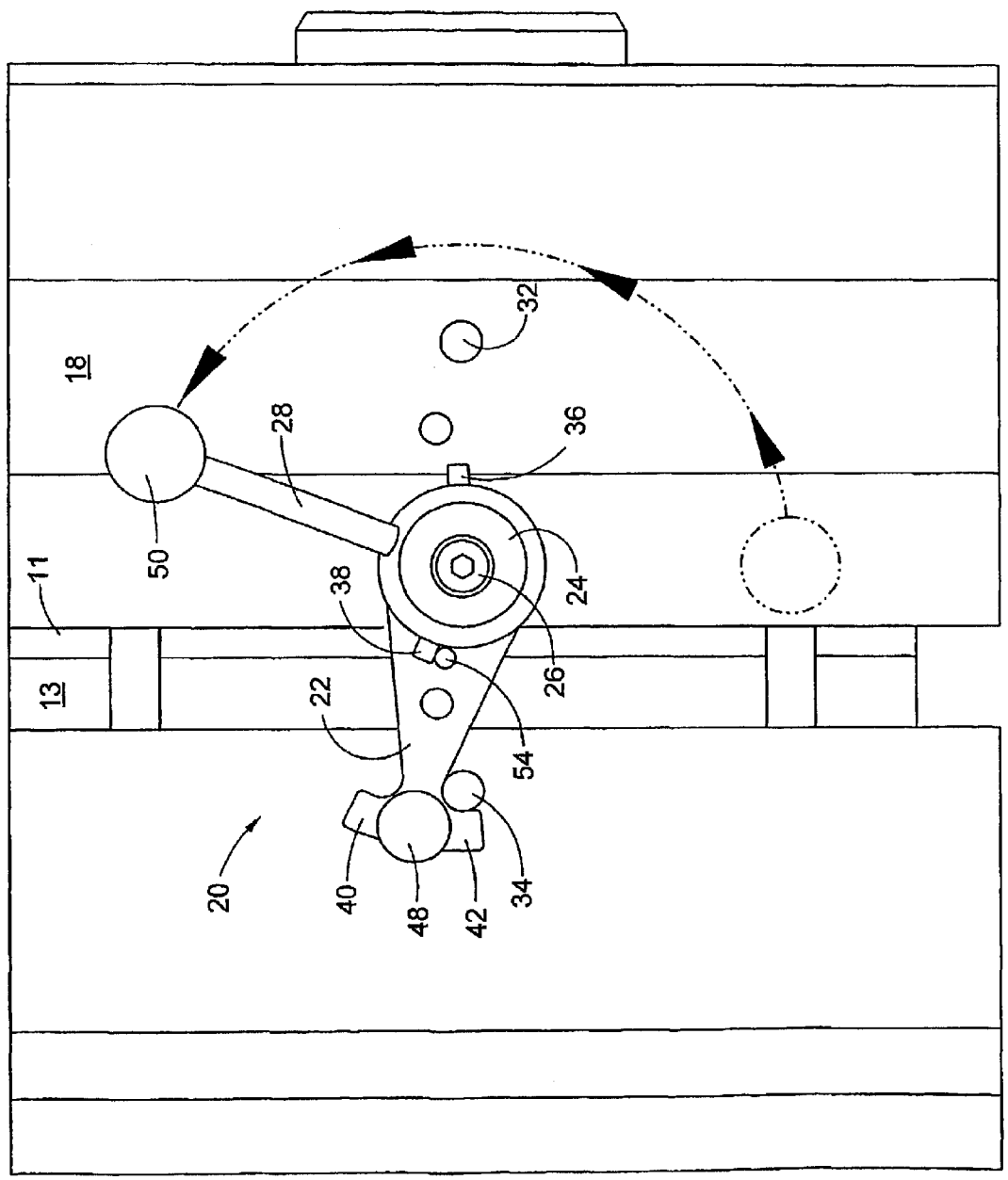
FIG. 5 is a side view of an injection mold assembly similar to FIG. 4, showing movement of the latch lever to rotate the center hub of the latching device of the present invention, thereby applying a cam force to hold the "A" and "B" plates together.
Figure 6:
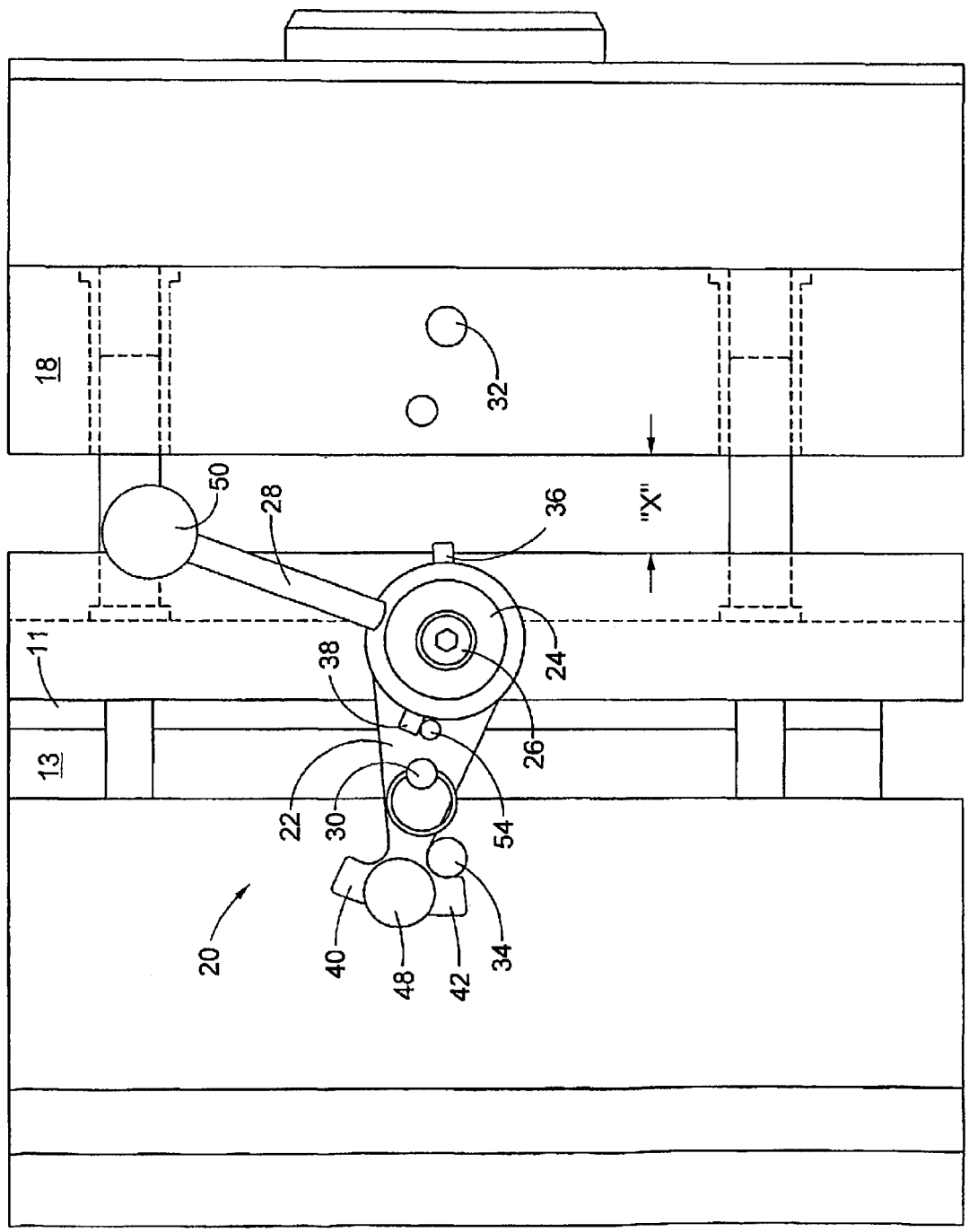
FIG. 6 is a side view of an injection mold assembly similar to FIG. 5, showing the mold opened with the latching device of the present invention engaged to hold the "A" and "B" side plates together, so that the "A" side plate is moved away from the nozzle plate.
Figure 7:
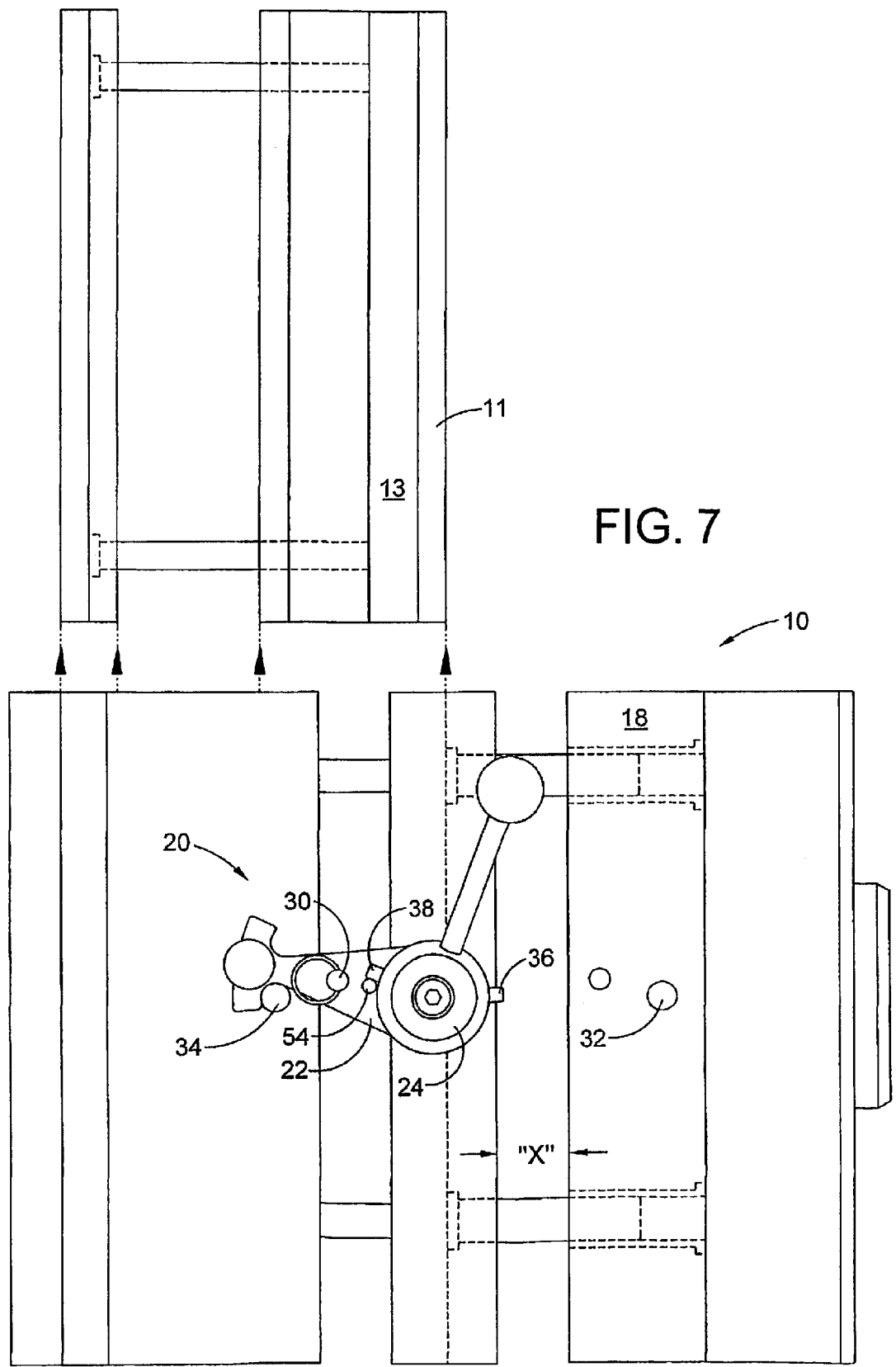
FIG. 7 is a side view of an injection mold assembly similar to FIG. 6, showing the mold open and the mold inserts being removed from the top of the "A" and "B" mold sections.

The latch arm 22 can then be rotated as shown in FIG. 4 so that it engages the dowel pin 34 in the "B" side 14 of the mold 10. Further rotation of the center hub 24 by means of the latch handle 28 until the stop pin 38 contacts pin 54 will provide the camming action to hold the "A" side against the "B" side, as shown in FIG. 5. The safety pin 30 is inserted to hold the latch arm 22 in position. With the latching device 20 in this position, the clamp mechanism is operated to open the mold 10 a distance "X" as illustrated in FIG. 6. The nozzles of the hot runner system will now clear the "A" side 12 so that the mold inserts that actually comprise the cavity mold portion 12 and a core mold portion 14 can be removed from the top of the mold 10; see FIG. 7.

INDUSTRIAL APPLICABILITY

The foregoing discussion and the illustrated embodiment of the invention teach a latching device that uses a cam action to hold the "A" side plate against the hot runner nozzle plate during operation, thus replacing the screws used in prior art mold constructions. Preferably, the latching device is provided on each side of the mold to hold most effectively the "A" side plate against the nozzle plate during the high pressure injection of plastic melt.

Although particular embodiments of the present invention have been illustrated and described, it will be apparent to those skilled in the art that changes in modifications can be made without departing from the concepts of the present invention. Accordingly, it is intended to encompass within the appended claims all such changes and modifications that fall within the scope of the present invention.

What is claimed is:

1. A latching device (20) to facilitate removal or installation of replaceable cavity and core inserts in an injection mold assembly (10), characterized in that the latching device (20) comprises a latch arm 22 having opposed hooks 40,42 at one end and a pivot hole 44 at the other end, the pivot hole 44 of the latch arm 22 mounting on a center hub 24 that is rotatably attached to one side (12) of the mold assembly by means of an axial bore (56), the center hub 24 being configured so that the axial bore (56) is offset slightly with respect to the axis of a cylindrical bearing surface (46) that is received in the pivot hole 44 of the latch arm 22, such that this offset creates a camming action in the latching device 20 when the center hub 24 is rotated relative to the latch arm 22.

2. A method of changing cavity and core inserts of a mold assembly in an injection molding machine comprising the steps of:

(a) operating a clamp mechanism of the molding machine to close the mold assembly, (b) rotating a center hub of a latching device using a lever to release the latching force between an "A" side of the mold assembly and a nozzle plate in the mold assembly (c) rotating a latch arm to engage a pin on a "B" side of the mold assembly, (d) rotating the center hub to generate a latching force between the "A" and "B" sides of the mold assembly, (e) inserting a safety pin in the latch arm, (f) operating the clamp mechanism of the molding machine to open the mold, moving the "B" and "A" sides together to clear hot runner nozzles of the mold assembly, (g) removing the cavity and core from the mold assembly, (h) installing new cavity and core in the mold assembly, and (i) reversing the procedure of steps (a)–(f) so that the latch arm ends tightly engaged with the pin in the nozzle plate and the mold is ready for production.

* * * * *